United States Patent
Shakya et al.

(10) Patent No.: US 8,433,175 B2
(45) Date of Patent: Apr. 30, 2013

(54) VIDEO COMPARING USING FINGERPRINT REPRESENTATIONS

(75) Inventors: Subodh Shakya, San Jose, CA (US); Karen Yang, Milpitas, CA (US); Ashok K. Kumar, San Jose, CA (US); Prasanna Satyamurthy, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1188 days.

(21) Appl. No.: 12/259,849

(22) Filed: Oct. 28, 2008

(65) Prior Publication Data

US 2010/0104259 A1  Apr. 29, 2010

(51) Int. Cl.
*H04N 9/80* (2006.01)

(52) U.S. Cl.
USPC ............ 386/241; 707/741; 382/190

(58) Field of Classification Search .......... 386/248–250, 386/241; 707/741; 382/190, 195, 203
See application file for complete search history.

(56) References Cited

U.S. PATENT DOCUMENTS

| | | | | | |
|---|---|---|---|---|---|
| 5,109,435 | A | * | 4/1992 | Lo et al. | 382/103 |
| 5,877,804 | A | * | 3/1999 | Otsuki et al. | 348/155 |
| 6,480,841 | B1 | * | 11/2002 | Higashio et al. | 1/1 |
| 6,771,885 | B1 | * | 8/2004 | Agnihotri et al. | 386/314 |
| 6,956,603 | B2 | * | 10/2005 | Fujii | 348/169 |
| 6,985,172 | B1 | * | 1/2006 | Rigney et al. | 348/149 |
| 7,203,366 | B2 | * | 4/2007 | Miyatake et al. | 382/190 |
| 7,627,171 | B2 | * | 12/2009 | Hampshire et al. | 382/173 |
| 8,171,030 | B2 | * | 5/2012 | Pereira et al. | 707/741 |
| 2006/0103732 | A1 | * | 5/2006 | Bateman | 348/208.2 |
| 2008/0089591 | A1 | * | 4/2008 | Zhou et al. | 382/224 |
| 2008/0263042 | A1 | * | 10/2008 | Li et al. | 707/7 |
| 2009/0154806 | A1 | * | 6/2009 | Chang et al. | 382/173 |
| 2009/0297048 | A1 | * | 12/2009 | Slotine et al. | 382/224 |
| 2009/0328237 | A1 | * | 12/2009 | Rodriguez et al. | 726/32 |
| 2010/0054537 | A1 | * | 3/2010 | Bateman | 382/103 |
| 2010/0104018 | A1 | * | 4/2010 | Bregler et al. | 375/240.16 |
| 2011/0007932 | A1 | * | 1/2011 | Zhang | 382/100 |
| 2011/0122255 | A1 | * | 5/2011 | Haritaoglu | 348/180 |
| 2011/0261257 | A1 | * | 10/2011 | Terry et al. | 348/515 |
| 2012/0274777 | A1 | * | 11/2012 | Saptharishi et al. | 348/159 |

OTHER PUBLICATIONS

Radhakrishnan et al., "Content-based Video Signatures based on Projections of Difference Images", IEEE, 2007.*

* cited by examiner

*Primary Examiner* — David Harvey
(74) *Attorney, Agent, or Firm* — Berkeley Law & Technology Group, LLP (57) ABSTRACT

Disclosed is a method comprising identifying one or more moving features in a first video via a computing platform, representing the one or more moving features as fingerprint representations via the computing platform, and comparing the fingerprint representations with fingerprint representations of a second video to determine a match via the computing platform.

16 Claims, 7 Drawing Sheets

Blob 650: *02FAC72FA09AA0CC29E7F8EBB084F7C4*
Blob 652: *94F0999CFF84DE3C60287CC40751CD4E*
Blob 654: *2FED3BCC05FA752B6B8475219DCB5FD4*
Blob 670: *C6B64328FE0414F3DC9361835621DA42*
Blob 656: *4E6B7D671A83B10597AC341ACEA4E68A*
Blob 680: *D240BED93EF3820A15B60F1B8D540E15*

A1B2BE8D5E1_5E23FC8EA163F6FCB26BB
925

A1B2BE8D5E1_5E23FC8EA163F6FCB26D2
915

FIG. 9

VIDEO COMPARING USING FINGERPRINT REPRESENTATIONS

BACKGROUND

1. Field

Subject matter disclosed herein relates to a method of detecting video content, and in particular, to a method of defining one or more digital fingerprints to identify video content.

2. Information

Video piracy via the Internet has become a formidable problem as online video sharing continues to increase in popularity. For example, an Internet user can easily record a TV program or pilfer a video from the Internet, add his own name, remix the video, and upload pirated video onto any number of video sharing sites on the Internet.

Detecting such pirated videos may be an enormous task since a tremendous number of videos may be involved. Moreover, each video typically includes a large amount of data to represent perhaps thousands of video frames that make up typical video. Adding to a difficulty of detecting pirated videos is the fact that pirated videos may be "disguised" by altering one or more video features. For example, a portion of a video image may be rotated, enlarged, stretched in one direction, labeled, colored, blurred, and/or edited in other ways.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing node, such as a computer or a similar electronic computing device, that manipulates and/or transforms data represented as physical electronic and/or magnetic quantities within the computing node's memories, registers, and/or other information storage, transmission, and/or display devices.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In an embodiment, a video, which may comprise a relatively large number of frames, may be reduced to one or more images that move relative to an image background. Such moving images may then be assigned a digital fingerprint that may correspond to features of the moving images. A digital fingerprint may be generated using software that may identify, extract, and compress characteristic components of a video, or attributes, enabling at least a portion of a video to be identified by its resultant "fingerprint". A video fingerprint may be based on any number of video features including, but not limited to, color, brightness, and motion changes during a video sequence. Of course, such generation of digital fingerprints is merely an example, and claimed subject matter is not so limited.

In one particular implementation, such a digital fingerprint may comprise a 32-character string or key, though claimed subject matter is not so limited. Components, which may comprise individual or groups of characters, of a digital fingerprint may represent various image features, such as aspect ratio, position, color, and hue just to mention a few examples. Accordingly, a video segment may be represented by multiple digital fingerprints which substantially represent distinguishing elements of the video segment using much less data than that of the original video segment. Such a reduction in an amount of data involved to represent a video segment may improve a capability of comparing the video segment to a relatively large number of other videos, which may also be represented by such digital fingerprints. Such comparing may allow a detection of video content to detect, for example, video piracy and/or copyright infringement.

A difficulty in detecting video piracy and/or copyright infringement may arise from a possibility that a copied video may be altered, perhaps slightly, intentionally or unintentionally. For example, a copying process may unintentionally introduce noise, discoloration, and/or spatial distortion to the video copy. Meanwhile, intentional alterations may include adding one or more video labels, changing a speed of the video, rotating and/or changing sizes of images, and so on. Therefore, representing such an altered video copy using a single digital fingerprint may work poorly in detecting such a video as a copy of an original video, since a comparison to a digital fingerprint of the original video may not yield a match. In contrast, representing a video with multiple fingerprints, wherein individual fingerprints may represent different portions of the video, may allow more detailed and accurate comparisons to other videos using similar representations.

Figure 1:
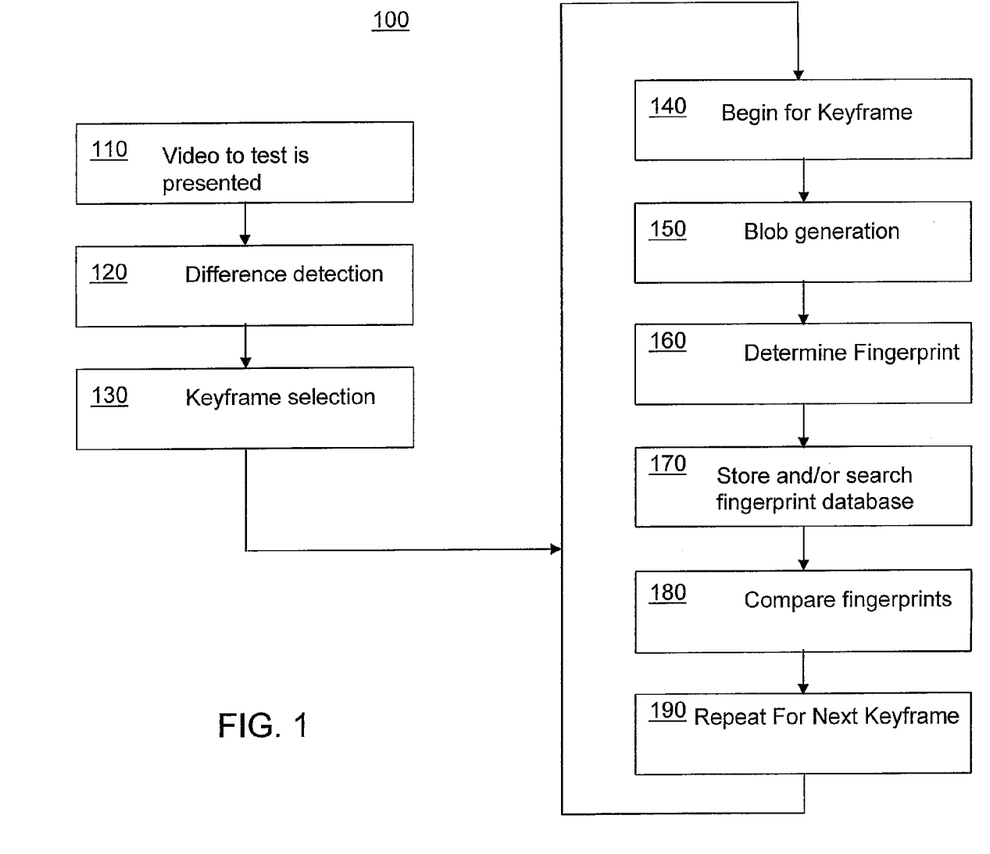
FIG. 1 is a flow diagram of a process to determine digital fingerprints, according to an embodiment.
Figure 2:
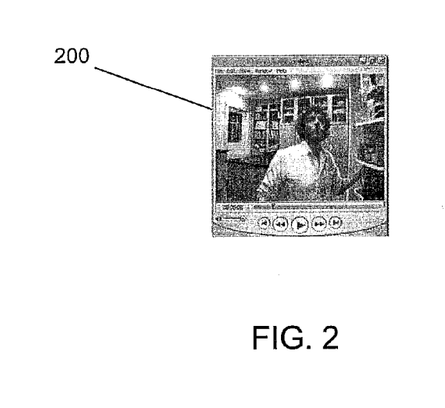
FIG. 2 depicts a single frame of a video file, according to an embodiment.
Figure 3:
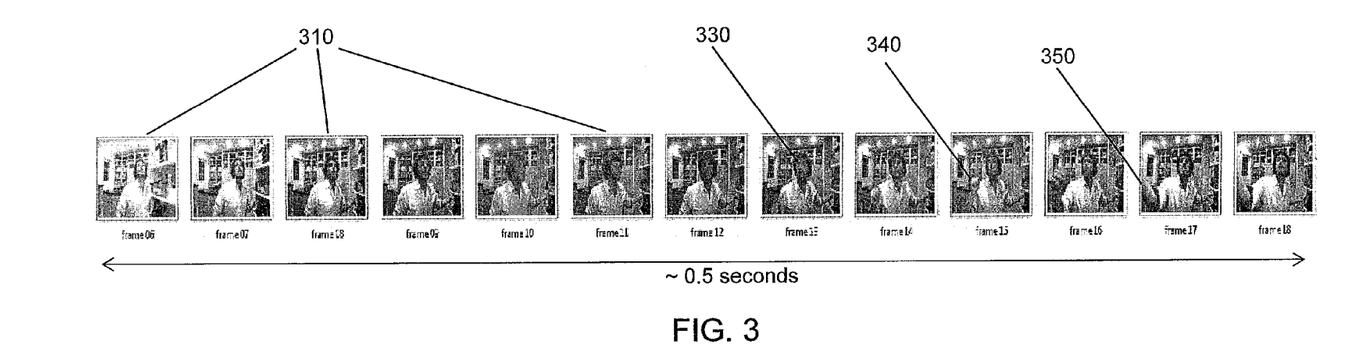
FIG. 3 depicts a sequence of video frames, according to an embodiment.

FIG. 1 is a flow diagram of a process 100, which may be performed on a computing platform, to determine digital fingerprints, according to an embodiment. At block 110, at least a portion of a video file may be presented via the Internet, for example, at a video sharing website. FIG. 2 depicts a frame of such a video file 200, which may be selected to test whether it includes pirated video content, for example. Such a video file may include a large number of video frames 310 for each second of video content, as shown in FIG. 3 for example. In a particular embodiment, video file 200 may include 29 frames per second of video, though such a number may vary depending at least in part on a video format and type of media on which the video file is presented, and claimed subject matter is not so limited.

Video file 200 may have a length of seconds, minutes, or hours. Accordingly, such a video file may comprise a relatively large number of video frames, corresponding to a large amount of video data. To reduce such an amount of data, difference detection may be performed, as in block 120. In the example shown in FIGS. 2 and 3, video file 200 includes an image of a person moving his head 330, a hand 340, and an arm 350 relative to an image background. In the present context, image background may refer to at least a portion of a video frame that does not substantially move from one frame to the next frame. Removing such an image background from one or more sequential video frames of a video file may be performed by detecting a difference between or among the sequential video frames. Portions of a video frame that change from one frame to the next may be retained while other portions, comprising an image background, may be discarded, for example. Removing such a background and retaining portions of video features that substantially change from frame to frame may result in a frame sequence 400 of frames 420 shown in FIG. 4. As shown in the figure, head image 410 substantially moves from frame to frame, hand image 430 substantially moves from frame 13 to frame 14, and hand image 440 substantially moves from frame 14 to frame 15, and so on. Accordingly, video frame sequence 400 may include significantly less data compared to video file 200, while retaining substantive portions of the video file.

Figure 4:
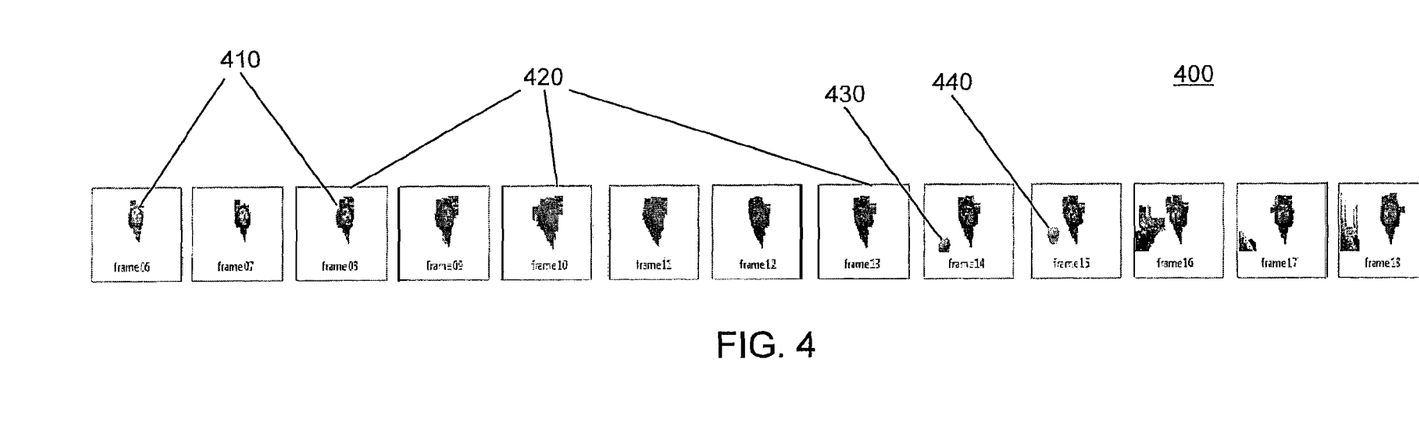
FIG. 4 depicts an object in a sequence of video frames without video background, according to an embodiment.

In an embodiment, a portion of video frame sequence 400 may be selected as video keyframes, as performed at block 130 of process 100 in FIG. 1. Such a selection may involve identifying an individual video frame among a sequence of individual frames to represent such a sequence of the individual frames. Such a sequence may include a continuous or non-continuous sequence of individual frames. In addition, such a selection may be based at least in part on video frame attributes, such as quality, hue, saturation, and focus, just to name a few examples. A keyframe selection may be based on how well a single video frame represents a sequence of video frames in a story-board view. In such a view, a video comprising a sequence of video frames may be reduced to a relatively small subset of the video frames that maintain the story presented by the video. For example, a display of a sequence of story-board video frames may appear "choppy" compared to the original video, but would nevertheless convey the "story" of the video. Accordingly, a relatively large reduction in data size may be presented by using such a sequence of keyframe video frames to represent a video, albeit the resulting video may be discontinuous and appear choppy. Of course, such a description of story-board video frames is merely an example, and claimed subject matter is not so limited.

Figure 5:
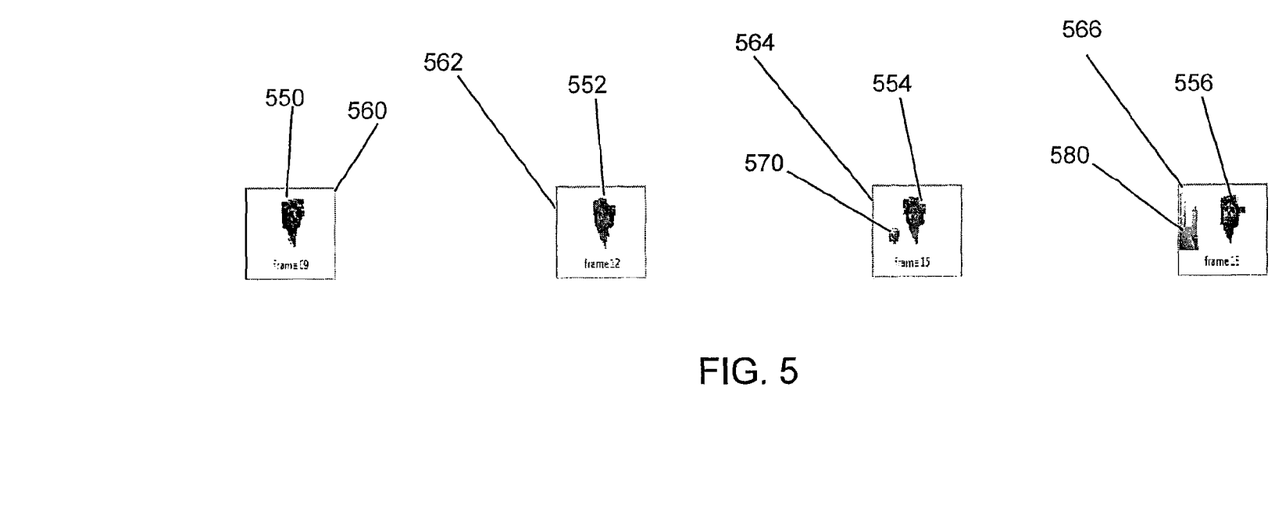
FIG. 5 depicts a sequence of keyframes according to an embodiment.

FIG. 5 shows a sequence of keyframes 560, 562, 564, and 566, according to an embodiment. A relatively large sequence of video frames, such as video frames 420 among the video frame sequence 400, may be examined to select a keyframe. In a particular example, individual frames among a sequence of, say, approximately 96 video frames may be examined for video attributes and a degree to which such an individual frame may represent its neighboring frames in a story-board view, as mentioned above. Accordingly, frame 9 in FIG. 4 may well represent its neighboring video frames and have acceptable video attributes to be selected as keyframe 560 in FIG. 5. Continuing with the example, frames 12, 15, and 18 in FIG. 4 may well represent their respective neighboring video frames and have acceptable video attributes to be selected as keyframes 562, 564, and 566, respectively.

In an embodiment, individual keyframes 550 may include one or more moving features, such as objects 550, 570, and 580, for example. Such moving objects may include video images that substantially change their position from frame to frame, such as head image 410 and hand images 430 and 440 shown in FIG. 4. Moving object 550 changes from keyframe to keyframe into moving object 552, 554, and 556, respectively, while moving object 570 makes a first appearance in keyframe 564 and is replaced by moving object 580. As explained above, keyframes may represent a video by maintaining at least a story-board presentation of the video. Similarly, moving objects may represent their respective keyframe in which they're located. For example, moving object 550 may represent keyframe 560, keyframe 564 may be represented by moving objects 554 and 570, and keyframe 566 may be represented by moving objects 556 and 580. Of course, such representations of keyframes are merely examples, and claimed subject matter is not so limited.

Figure 6:
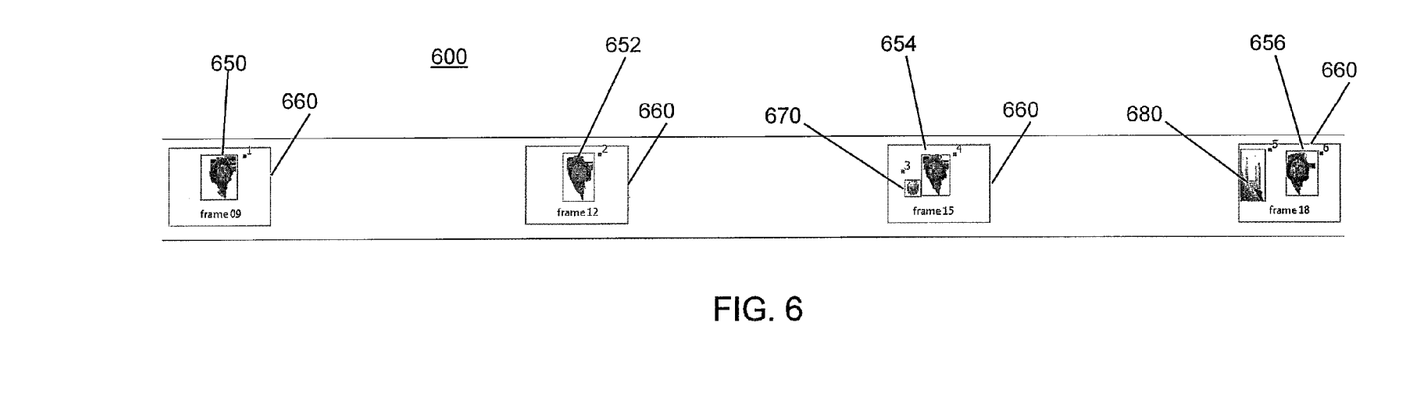
FIG. 6 depicts example video blobs, according to an embodiment.

FIG. 6 shows a sequence 600 of keyframes 660 including video blobs, according to an embodiment. Wherein video objects may comprise a portion of a keyframe, video blobs need not be part of such a keyframe. A process, such as at blocks 140 and 150 of process 100 in FIG. 1, to generate a video blob from a video object may include retaining only a portion of a keyframe that includes the video object. For example, video blob 650 may be generated from video object 550 by retaining only the portion of keyframe 560 that includes video object 550. However, in one particular implementation, a video blob may be associated with the keyframe from which it was generated as a way of preserving a time order originally set forth by video 200, for example. In another particular implementation, a video blob need not be associated with a keyframe but may nevertheless preserve a time order by being stored in a data file in a fixed sequence with other video blobs generated from video file 200, for example.

Figure 7:
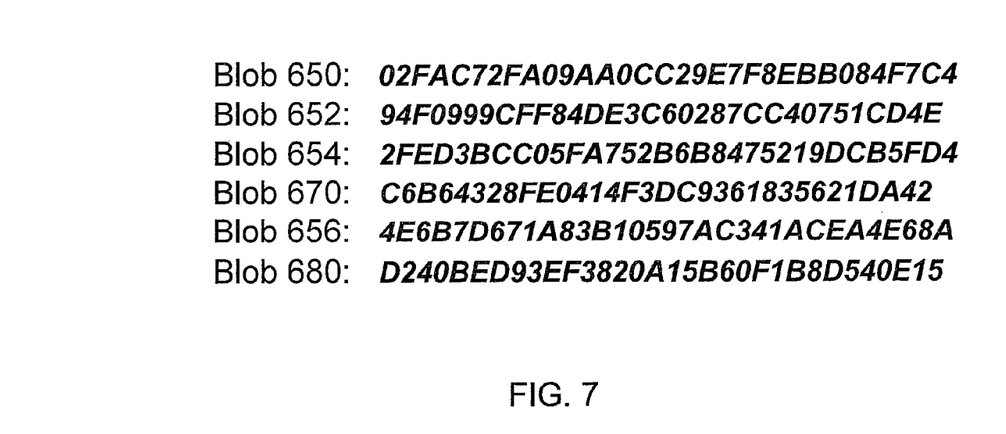
FIG. 7 depicts a list of example digital fingerprints, according to an embodiment.

In an embodiment, individual video blobs may be assigned a digital fingerprint, as at block 160, which may include an identification encoded with attributes of the video blob that it represents. In particular, such a digital fingerprint may include a digital fingerprint comprising an N-character key, where N is an integer. In a particular embodiment, a digital fingerprint may comprise a hexadecimal 32-character key, as shown in FIG. 7, though characters of such a key are not limited to hexadecimal characters, and such a key may comprise any number of characters. Such a digital fingerprint may include individual or groups of characters that represent particular video blob attributes, such as orientation, color, hue, size, and so on. Such attribute representation will be described below.

FIG. 7 shows a list of example digital fingerprints that may correspond to video blobs shown in FIG. 6, according to an embodiment. Each such video blob may be represented by a digital fingerprint comprising characters related to particular video blob attributes, as mentioned above. In a particular implementation, such characters may comprise hexadecimal values that quantify a particular attribute of a video blob, as mentioned above. For example, video color of a particular portion of a video blob may be an attribute that corresponds to, say, the $5^{th}$ character from the right of a 32-character key. In such an example, the $5^{th}$ hexadecimal character may assume any of sixteen hexadecimal values, from zero to "F". Accordingly, any of sixteen different colors may be represented by a hexadecimal character. In another example, two characters may be used to represent 256 different attribute values. Of course, such a character key may comprise any number of characters and is not limited to hexadecimal characters, and claimed subject matter is not so limited.

Though a casual observation of video blobs 652 and 654 may find them to look almost identical, there are a number of different features that may be quantified and identified via their corresponding digital fingerprints. Accordingly, video blob 652 may be assigned a fingerprint comprising the hexadecimal 32-character key 94F0999CFF84DE3C60287CC40751CD4E, whereas video blob 654 may be assigned a fingerprint comprising the hexadecimal 32-character key 2FED3BCC05FA752B6B8475219DCB5FD4, for example. Generating such a sequence of characters for a digital fingerprint may include a process that identifies and quantifies attributes of a video keyframe, and assigns hexadecimal values according to such attribute measurements, as described above. Differences among the respective fingerprints may arise from corresponding differences among attributes of video blobs 652 and 654. For example, a blob image of a head rotated with respect to another video blob may lead to a redistribution of color, brightness and hue so that these attributes are different, such as between video blobs 652 and 654. Accordingly, such differences may result in different assigned digital fingerprints. Similarly, video blobs 570, 580, 556, and so on have different fingerprints, as shown in FIG. 7.

As shown above, process 100 may reduce a portion of video file 200, shown in FIG. 3 for example, to a relatively small number of digital fingerprints as shown in FIG. 7. Such digital fingerprints are relatively easy to store in a database, for example, and they may also be relatively easy to search, such as at block 170 of process 100 in FIG. 1. Accordingly, such a process may provide a set of one or more digital fingerprints to represent a video file. Such a set of fingerprints may be digitally compared to other sets of fingerprints that may represent other video files and/or portions of videos maintained in a database, for example. Such a database may include digital fingerprints of at least portions of videos owned by various entities, such as publishers and/or news organizations. In one implementation, such a comparison may be performed to detect video piracy, wherein a video may be produced by copying at least a portion of an original video without permission from owners of the original video. In a case of such video piracy, a comparison of a video under test with an original video may yield a match. Digitally comparing two or more digital fingerprints, such as at block 180 in FIG. 1, may involve a character-by-character comparison of a hexadecimal character key. For example, such a key may be parsed into components, or groups of one or more characters, wherein an individual component may represent at least a portion of a moving feature, such as an attribute of a video blob. A comparing algorithm, performed on a computing platform for example, may assign different weights to different characters or groups of characters, for example; certain group of characters may imply color and feature vectors whereas a match on certain other characters may imply a specific logo or screen portion match. In a particular embodiment, comparing digital fingerprints of videos may be performed keyframe by keyframe in process 100, from blocks 140 through 190, for example. Of course, other processes for comparing videos using digital fingerprints are possible, and claimed subject matter is not so limited.

Figure 8:
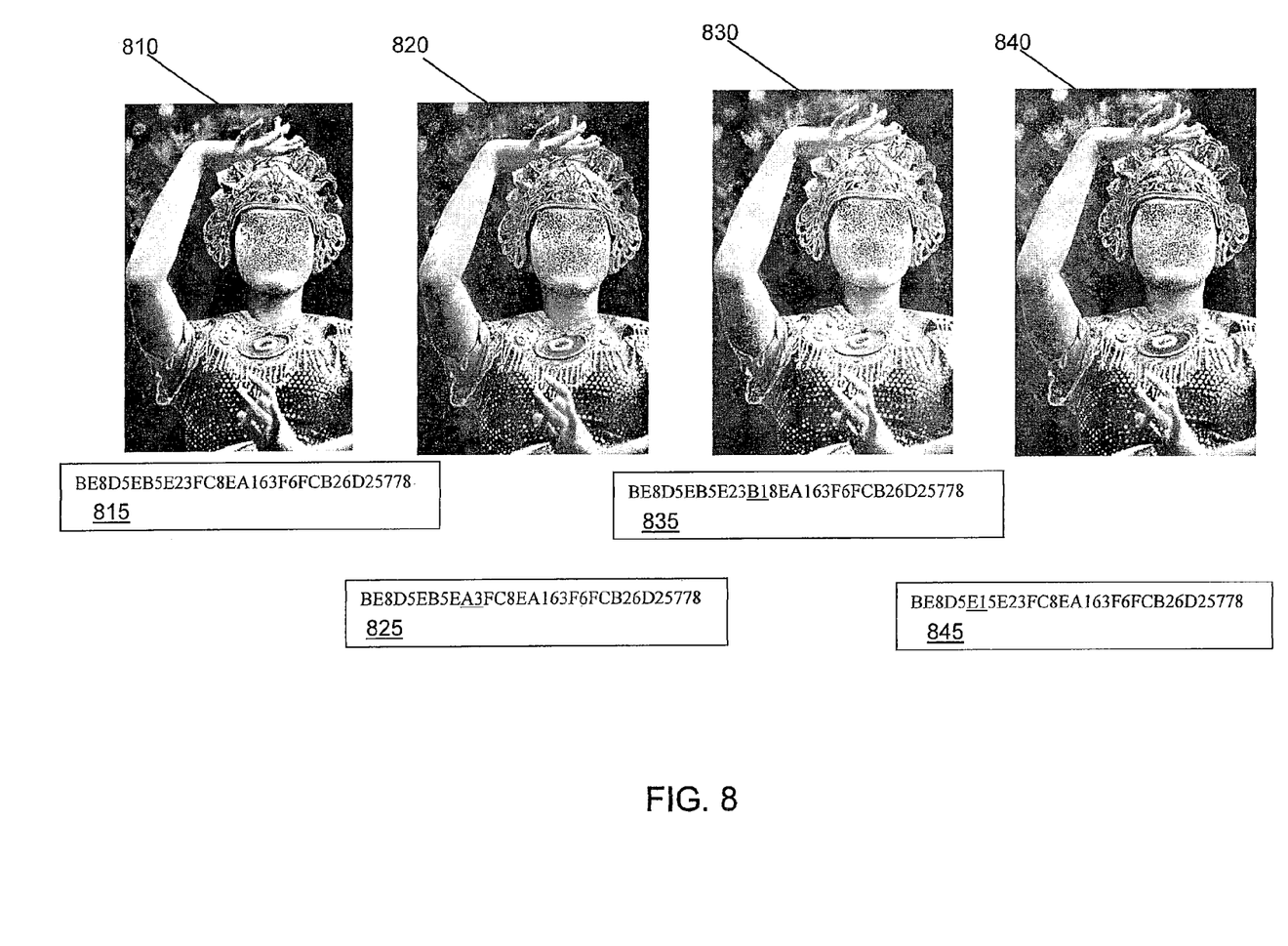
FIG. 8 depicts example blobs and their corresponding digital fingerprints, according to an embodiment.
Figure 9:
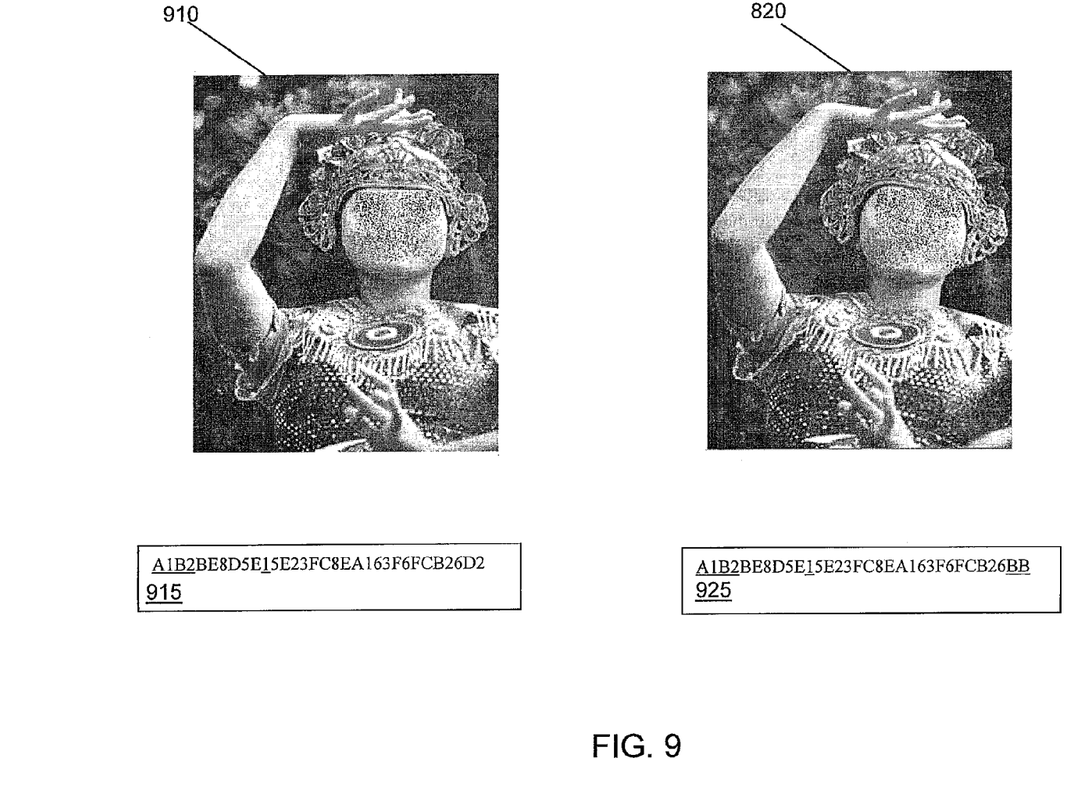
FIG. 9 depicts example blobs and their corresponding digital fingerprints, according to an embodiment.

FIGS. 8-9 show example video blobs and their corresponding digital fingerprints, according to an embodiment. To illustrate how digital fingerprints may change as a corresponding video blob changes, consider video blob 810 to be an original image, which may be represented by digital fingerprint 815. In one example, video blob 820 may be similar to video blob 810 but without color. Such a change in color may affect an associated digital fingerprint. For example, underlined characters of digital fingerprint 825 may represent a component that may change in response, at least in part, to changing video blob color. Accordingly, such a component is different than a corresponding component in digital fingerprint 815. Similarly, underlined characters of digital fingerprint 835, which corresponds to video blob 830 having a hue different than that of video blob 810 and 820, are different from the underlined characters in digital fingerprints 815 and 825. Video blob 840 includes a lighter hue than original video blob 810, and digital fingerprint 845 includes characters, shown underlined in FIG. 8, that are different than that of digital fingerprint 815 to represent such a lighter hue.

FIG. 9 shows video blobs 910 and 920 having varying degrees of rotation and aspect ratio. Accordingly, corresponding digital fingerprints include differences that are shown as underlined characters. For example, portions of a 32-character hexadecimal fingerprint that change in response to a rotation of the video blob may include the two right-most characters, which are BB in digital fingerprint 925, for example. Of course, such digital fingerprints, and the way they change with changing video blob, are merely examples, and claimed subject matter is not so limited.

As described above, digital fingerprints may act as identifiers of similar objects. In a particular implementation, matching a number of digital fingerprints identified from of a random web video to those from a published video may indicate that the web video is an illegal, pirated copy. Such a matching of a number of digital fingerprints, however, may only indicate that a portion of the web video is pirated content, and the two videos may not be the same in their entirety. Remixed videos may also be detected as copies, wherein such remixing may include only portions of one or more original videos. In another particular implementation, process 100 may include a feedback loop to increase its comparison accuracy by reclassifying videos whose digital fingerprints failed to provide a positive or negative comparison decision previously but subsequent data became available to later reach a decision.

Figure 10:
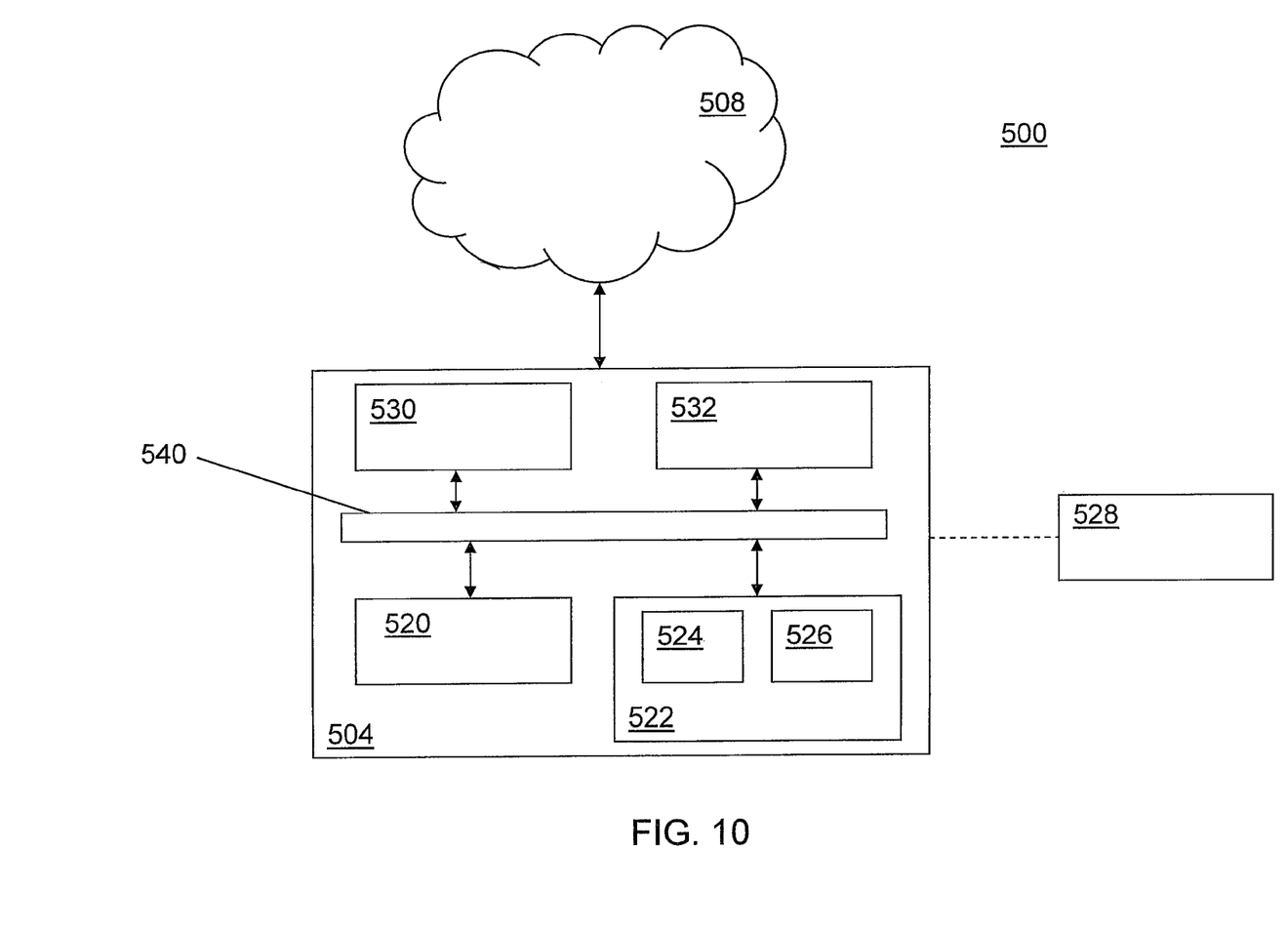
FIG. 10 is a schematic diagram illustrating an embodiment of a computing system.

FIG. 10 is a schematic diagram illustrating an exemplary embodiment of a computing system 500 that may include one or more devices configurable to process video files, such as generating and comparing digital fingerprints using one or more techniques illustrated herein, for example. Computing device 504, as shown in FIG. 10, may be representative of any device, appliance or machine that may be configurable to exchange data over network 508. By way of example but not limitation, computing device 504 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 508, as shown in FIG. 10, is representative of one or more communication links, processes, and/or resources configurable to support exchange of information between computing device 504 and other devices (not shown) connected to network 508. By way of example but not limitation, network 508 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

It is recognized that all or part of the various devices and networks shown in system 500, and the processes and methods as further described herein, may be implemented using or otherwise include hardware, firmware, software, or any combination thereof. Thus, by way of example but not limitation, computing device 504 may include at least one processing unit 520 that is operatively coupled to a memory 522 through a bus 540. Processing unit 520 is representative of one or more circuits configurable to perform at least a portion of a data computing procedure or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any data storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more data storage devices or systems, such as, for example, a disk drive, an optical disc drive, a tape drive, a solid state memory drive, etc. In certain implementations, secondary memory 526 may be operatively receptive of, or otherwise configurable to couple to, a computer-readable medium 528. Computer-readable medium 528 may include, for example, any medium that can carry and/or make accessible data, code and/or instructions for one or more of the devices in system 500.

Computing device 504 may include, for example, a communication interface 530 that provides for or otherwise supports the operative coupling of computing device 504 to at least network 508. By way of example but not limitation, communication interface 530 may include a network interface device or card, a modem, a router, a switch, a transceiver, and the like.

Computing device 504 may include, for example, an input/output 532. Input/output 532 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 532 may include an operatively configured display, speaker, keyboard, mouse, trackball, touch screen, data port, etc.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
    identifying one or more moving features in a first video via a computing platform;
    representing said one or more moving features as fingerprint representations via said computing platform;
    parsing said fingerprint representations into individual components that represent respective portions of said one or more moving features;
    assigning weights to said individual components based, at least in part, on said portion of said one or more moving features represented by said individual components; and
    comparing said weighted individual components of said fingerprint representations with corresponding individual components of fingerprint representations of a second video to determine a match via said computing platform.

2. The method of claim 1, wherein said fingerprint representations comprise an N-character key, and wherein N is an integer.

3. The method of claim 1, further comprising:
    modifying individual frames of said first video via a computing platform, said modifying including:
        detecting a difference between or among two or more sequential said individual frames of said first video, and
        removing background images from said one or more sequential frames based at least in part on said detected difference; and
    identifying one or more keyframes among said modified individual frames so that said one or more keyframes respectively represent a sequence of said modified individual frames.

4. The method of claim 3, wherein said identifying said one or more keyframes is based at least in part on properties of said modified individual frames, and wherein said properties comprise one or more of hue, saturation, and/or focus.

5. The method of claim 3, wherein said one or more keyframes include said one or more moving features.

6. The method of claim 5, wherein a single keyframe of said one or more keyframes includes more than one moving feature, and wherein individual moving features among said more than one moving feature are represented by respective fingerprint representations.

7. An apparatus comprising:
a memory; and
one or more processors, said one or more processors being adapted to:
   identify one or more moving features in a first video;
   represent said one or more moving features as fingerprint representations;
   parse said fingerprint representations into individual components that represent respective portions of said one or more moving features;
   assign weights to said individual components based, at least in part, on said portion of said one or more moving features represented by said individual components; and
   compare said weighted individual components of said fingerprint representations with corresponding individual components of fingerprint representations of a second video stored in said memory to determine a match.

8. The apparatus of claim 7, wherein said one or more keyframes include said one or more moving features.

9. The apparatus of claim 7, wherein said fingerprint representations comprise an N-character key, and wherein N is an integer.

10. The apparatus of claim 7, wherein said computing platform is further adapted to:
   modify individual frames of said first video by:
      detecting a difference between or among two or more sequential said individual frames of said first video, and
      removing background images from said one or more sequential frames based at least in part on said detected difference; and
   identify one or more keyframes among said modified individual frames so that said one or more keyframes respectively represent a sequence of said modified individual frames.

11. An article comprising: a non-transitory storage medium comprising machine-readable instructions stored thereon which, if executed by a computing platform, are adapted to enable said computing platform to:
   identify one or more moving features in a first video;
   represent said one or more moving features as fingerprint representations;
   parse said fingerprint representations into individual components that represent respective portions of said one or more moving features;
   assign weights to said individual components based, at least in part, on said portion of said one or more moving features represented by said individual components; and
   compare said weighted individual components of said fingerprint representations with corresponding individual components of fingerprint representations of a second video to determine a match.

12. The article of claim 11, wherein said one or more keyframes include said one or more moving features.

13. The article of claim 11, wherein a single keyframe of said one or more keyframes includes more than one moving feature, and wherein individual moving features among said more than one moving feature are represented by respective fingerprint representations.

14. The article of claim 11, wherein said fingerprint representations comprise an N-character key, and wherein N is an integer.

15. The article of claim 11, wherein said machine-readable instructions, if executed by a computing platform, are further adapted to enable said computing platform to:
   modify individual frames of said first video by:
      detecting a difference between or among two or more sequential said individual frames of said first video, and
      removing background images from said one or more sequential frames based at least in part on said detected difference; and
   identify one or more keyframes among said modified individual frames so that said one or more keyframes respectively represent a sequence of said modified individual frames.

16. The article of claim 15, wherein said identifying said one or more keyframes is based at least in part on properties of said modified individual frames, and wherein said properties comprise one or more of hue, saturation, and/or focus.

* * * * *